United States Patent
Huang et al.

(10) Patent No.: US 9,585,041 B2
(45) Date of Patent: Feb. 28, 2017

(54) METHOD AND APPARATUS FOR DETECTING A SLEEPING CELL

(75) Inventors: Min Huang, Beijing (CN); Petter Bergman, Ljungsbro (SE); Mehdi Amirijoo, Linkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/388,312

(22) PCT Filed: May 22, 2012

(86) PCT No.: PCT/CN2012/075906
§ 371 (c)(1),
(2), (4) Date: Sep. 26, 2014

(87) PCT Pub. No.: WO2013/173980
PCT Pub. Date: Nov. 28, 2013

(65) Prior Publication Data
US 2015/0172939 A1   Jun. 18, 2015

(51) Int. Cl.
*H04B 7/00* (2006.01)
*H04W 24/08* (2009.01)
(Continued)

(52) U.S. Cl.
CPC ......... *H04W 24/08* (2013.01); *H04L 41/0677* (2013.01); *H04L 43/04* (2013.01); *H04L 43/0888* (2013.01); *H04W 52/0203* (2013.01)

(58) Field of Classification Search
CPC ...... H04W 24/02; H04W 24/04; H04W 24/08
(Continued)

(56) References Cited

U.S. PATENT DOCUMENTS 6,327,677 B1 * 12/2001 Garg ................ H04L 41/06
                                                            709/224
8,095,075 B2 *  1/2012 Vadlamudi ......... H04W 24/04
                                                            455/423

(Continued)

FOREIGN PATENT DOCUMENTS

CN         1753541        3/2006
CN       102388644        3/2012

(Continued)

OTHER PUBLICATIONS

PCT Notification of Transmittal of the International Search Report and the Written Opinion of the International Searching Authority, or the Declaration for International application No. PCT/CN2012/075906, Feb. 28, 2013.

(Continued)

*Primary Examiner* — Dmitry H Levitan
(74) *Attorney, Agent, or Firm* — Baker Botts, LLP

(57) ABSTRACT

Embodiments of the disclosure provide a method and apparatus for detecting a sleeping cell. According to the method, amount of traffic-related activities in a candidate cell may be monitored in an observation period; accumulated amount may be calculated based on the monitored amount of traffic-related activities; and whether the candidate cell is a sleeping cell may be determined based on the accumulated amount. The accumulated amount may indicate accumulation of amount of traffic-related activities monitored in an accumulation period comprising at least one observation period.

12 Claims, 5 Drawing Sheets

(51) Int. Cl.
*H04W 52/02* (2009.01)
*H04L 12/24* (2006.01)
*H04L 12/26* (2006.01)

(58) Field of Classification Search
USPC .................. 370/310, 328, 241, 242, 253
See application file for complete search history.

(56) References Cited

U.S. PATENT DOCUMENTS

| | | | | |
|---|---|---|---|---|
| 8,699,324 B2* | 4/2014 | Sun | ..................... | H04L 41/0681 370/216 |
| 8,750,856 B2* | 6/2014 | Kumar | ................. | H04W 24/04 340/635 |
| 2006/0063521 A1* | 3/2006 | Cheung | .................. | H04L 41/06 455/423 |
| 2009/0135730 A1* | 5/2009 | Scott | ..................... | H04W 24/02 370/252 |
| 2010/0234006 A1 | 9/2010 | Vadlamudi | | |
| 2011/0037601 A1 | 2/2011 | Kumar et al. | | |
| 2014/0211638 A1* | 7/2014 | Huang | .................. | H04W 24/06 370/249 |
| 2015/0085681 A1* | 3/2015 | Bowdery | .............. | H04W 24/02 370/252 |

FOREIGN PATENT DOCUMENTS

| WO | WO 2011/157164 | 12/2011 |
|---|---|---|
| WO | WO 2012/005633 | 1/2012 |

OTHER PUBLICATIONS

European Patent Office, Communication and Supplementary European Search Report received from Foreign Associate for Application No. 12877107.8-1854 / 2853108 PCT/CN2012075906, Ref. SJB/PX213153EP, 9 pages, Jan. 26, 2016.

\* cited by examiner

METHOD AND APPARATUS FOR DETECTING A SLEEPING CELL

PRIORITY

This nonprovisional application is a U.S. National Stage Filing under 35 U.S.C. §371 of International Patent Application Serial No. PCT/CN2012/075906, filed May 22, 2012 and entitled "Method and Apparatus for Detecting a Sleeping Cell".

TECHNICAL FIELD

Embodiments of the present invention generally relate to communication techniques. More particularly, embodiments of the present invention relate to a method and apparatus for detecting a sleeping cell.

BACKGROUND

In a practical communication network, such as a network employs GSM, CDMA, UMTS or LTE technologies, it is often encountered with a number of cells that malfunction with some kind of fault, due to different causes, including hardware crash, software crash or any algorithm design error. These cells may behave like although these cells run without any alarm from operation and maintenance (O&M) perspective, but no UEs have traffic transfer in them. In this case, before taking serious examination of network infrastructures, which may take quite a long time, an instant solution is to restart these cells as well as sending an alarm to O&M system. This kind of cells are called as sleeping cells and the function of detecting and recovering sleeping cells is called as advanced cell supervision (ACS).

The first and also most critical procedure in ACS function is the operation of detecting the sleeping cell. Specifically, the communication network should be able to distinguish the real sleeping cell and the empty un-loaded cell, both of which observe no traffic transfer in the cell. According to existing solutions, some approaches for detecting a sleeping cell have been proposed. One straightforward approach is to monitor the cell traffic, and once no traffic lasting a sufficient long period appears, this cell may be suspected as a sleeping cell. However, this approach only relies on the previous traffic records but no any hint of current situation, so it leads to high false alarm ratio or long latency because it is difficult to determine how long this period should be set.

Another approach for detecting a sleeping cell is to find some activities which have correlation with traffic in a cell in one period, monitor the traffic happened in the cell if amount of the activities in the period exceeds a threshold, and once no traffic lasting the period appears, this cell may be suspected as a sleeping cell. However, in practice, the load situation for a cell on different moments may vary a lot, e.g., within 24 hours in a day, which may cause the difficulty of setting the value of threshold. On one hand, this threshold should be set small enough so that no real fault is missed with low traffic load; on the other hand, this threshold should be set large enough so that no false alarm is caused by various kinds of disturbing factors. The disturbing factors might appear randomly in cell running, which would lead to a number of traffic-related activities emerging due to these disturbing factors but not the real cell traffic. Some exemplified disturbing factors include noise, interference from neighbor cells, signaling latency, UE radio link failure and UE operation fault. Since the load situation in a cell might vary faster than the threshold is manually configured, the threshold is often not suitable for the specific load situation. In particular, in the case that the threshold is too small, a cell may be incorrectly detected as a sleeping cell due to high disturbing factors; and in the case that the threshold is too large, most sleeping cells may not be detected because the possibility to monitor the traffic happened in the cell is very low.

In view of the foregoing problems, there is a need to find a suitable solution for detecting a sleeping cell, so as to improve detection accuracy for different load situations.

SUMMARY

The present invention proposes a solution which detects a sleeping cell in a communication network, such as a GSM network, a CDMA network, a UMTS network, a LTE network, etc. Specifically, the present invention provides a method and apparatus for detecting a sleeping cell, which effectively improves the detection accuracy for different load situations.

According to a first aspect of the present invention, embodiments of the invention provide a method for detecting a sleeping cell. According to the method, amount of traffic-related activities in a candidate cell may be monitored in an observation period; accumulated amount may be calculated based on the monitored amount of traffic-related activities; and whether the candidate cell is a sleeping cell may be determined based on the accumulated amount. The accumulated amount may indicate accumulation of amount of traffic-related activities monitored in an accumulation period comprising at least one observation period.

According to a second aspect of the present invention, embodiments of the invention provide an apparatus for detecting a sleeping cell. The apparatus may comprise: a monitor, a calculator and a determiner. The monitor may be configured to monitor amount of traffic-related activities in a candidate cell in an observation period. The calculator may be configured to calculate accumulated amount based on the monitored amount of traffic-related activities. The accumulated amount may indicate accumulation of amount of traffic-related activities monitored in an accumulation period comprising at least one observation period. The determiner may be configured to determine whether the candidate cell is a sleeping cell based on the accumulated amount.

Compared with those existing solutions, the proposed solution detects a sleeping cell based on accumulation of amount of traffic-related activities monitored in an accumulation period, so that false alarms caused by disturbing factors may be effectively decreased and the accuracy of sleeping cell detection for different load situations is effectively improved.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

Throughout the figures, same or similar reference numbers indicate same or similar elements.

DETAILED DESCRIPTION

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

Embodiments of the present invention provide a method and apparatus for detecting a sleeping cell. As further discussed below, amount of traffic-related activities in a candidate cell in an observation period may be monitored to calculate an accumulated amount. The accumulated amount indicates accumulation of amount of traffic-related activities monitored in an accumulation period comprising at least one observation period. Based on the accumulated amount, it is determined whether the candidate cell is a sleeping cell. In this way, the false alarm caused by disturbing factors may be effectively decreased, and the detection of a sleeping cell is more adapted for different load situations. Now some exemplary embodiments of the present invention will be described below with reference to the figures.

Figure 1:
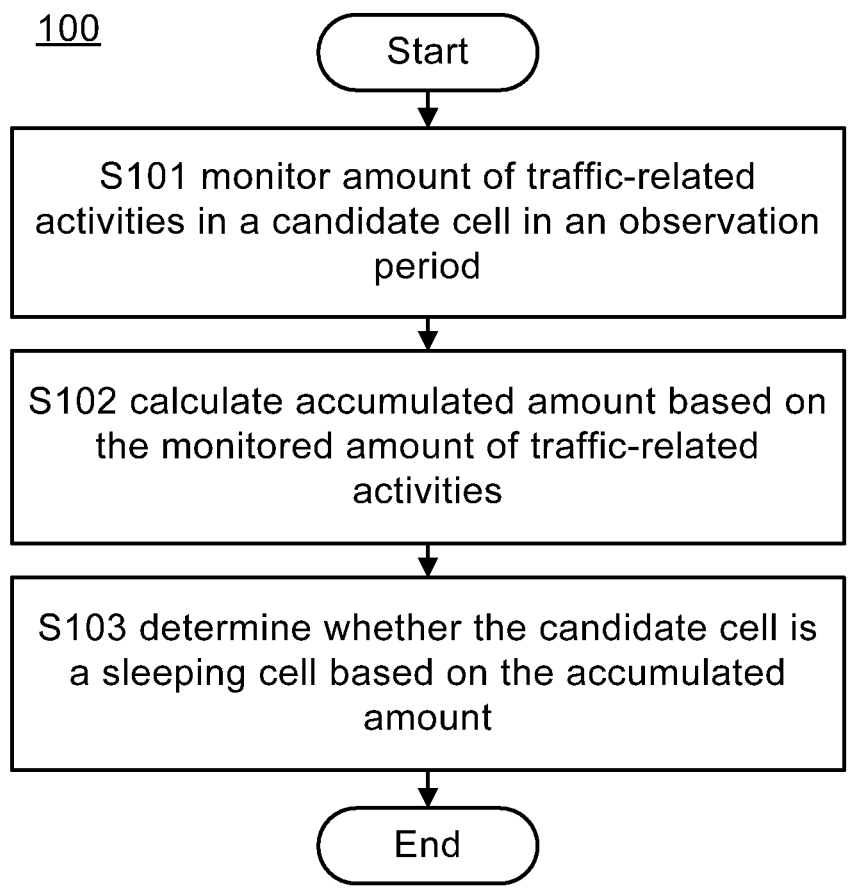
FIG. 1 illustrates a flow chart of a method for detecting a sleeping cell according to an embodiment of the invention.

Reference is first made to FIG. 1, which illustrates a flow chart of a method 100 for detecting a sleeping cell according to an embodiment of the invention. In accordance with embodiments of the present invention, method 100 may be carried out by, for example, a base station (BS), a base station controller (BSC), a gateway, a relay, a server, or any other applicable device.

After method 100 starts, at step S101, amount of traffic-related activities in a candidate cell in an observation period is monitored.

In accordance with embodiments of the present invention, the candidate cell is a cell suspected as a sleeping cell. By performing the method according to embodiments of the present invention, it will be determined whether the candidate cell is a sleeping cell or not. Traffic-related activities may indicate activities relating to traffic in a candidate cell, which is not the actual traffic in the candidate cell, but related activities happened before, after and/or accompanying the actual traffic. For example, the traffic-related activities may comprise Physical Random Access Channel (PRACH) preamble transfer, random access step-3 transfer, Radio Resource Control (RRC) Connection Setup message transfer, etc. The random access step-3 transfer may relate to transmission of user equipment identifier in random access. In some embodiments, the traffic-related activities may be either the activities happening at base stations, e.g., eNodeBs in a LTE system, who controls the concerned cell, or the incoming signaling from other network nodes, e.g., neighbor eNodeBs with X2 connection or Mobility Management Entity (MME) with S1 connection. X2 connection may be a connection between two eNBs in which the data and signaling are transferred. S1 connection may be a connection between one MME or one serving gateway and one eNB in which the data and signaling are transferred.

The observation period indicates a period in which traffic-related activities in the candidate cell is observed. The amount of traffic-related activities may be obtained based on the traffic-related activities observed in the observation period. In embodiments of the present invention, the observation period may be predetermined by, e.g., an operator, a provider, a vendor, etc. In an embodiment, the observation period may be set as 5 minutes.

At step S102, accumulated amount is calculated based on the monitored amount of traffic-related activities.

In accordance with embodiments of the present invention, the accumulated amount indicates accumulation of amount of traffic-related activities monitored in an accumulation period. The accumulation period may comprise at least one observation period.

The accumulation period indicates a period in which amount of traffic-related activities monitored in one or more observation periods are accumulated. The accumulation period is not a fixed period, but a period with variable length. In accordance with embodiments of the present invention, the accumulation period may comprise only one observation period or plurality of observation periods, which depends on the accumulated amount.

In accordance with embodiments of the present invention, the accumulated amount may be calculated in several ways. For example, whether amount of traffic-related activities monitored in the observation period exceeds a second threshold may be determined first, and then the accumulated amount may be increased by the amount of traffic-related activities in response to the amount of traffic-related activities monitored in the observation period exceeding the second threshold.

In accordance with embodiments of the present invention, the second threshold may be adapted based on historical amount of traffic-related activities in the candidate cell. For example, a candidate second threshold may be obtained based on statistical information of the historical amount of traffic-related activities, and then the second threshold may be updated with the minimum of an initial second threshold and the candidate second threshold. The initial second threshold is fixed for the candidate cell. That is, the initial second threshold is a constant value. There is no need to manually change the initial second threshold according to different load conditions.

In accordance with embodiments of the present invention, the accumulation period may be restricted. For example, the length of the accumulation period may be restricted according to a predetermined latency for detecting a sleeping cell. As such, the predetermined latency for detecting a sleeping cell may be taken into account in calculating the accumulated amount. In an embodiment, the length of the accumulation period may be obtained first, whether the length of the accumulation period exceeds a predetermined latency for detecting a sleeping cell may be determined, and the accumulated amount may be reset in response to determining that the length of the accumulation period exceeds the predetermined latency.

At step S103, whether the candidate cell is a sleeping cell is determined based on the accumulated amount.

In accordance with embodiments of the present invention, the sleeping cell may be determined in several ways. For example, whether the accumulated amount exceeds a first threshold may be determined first; whether there is traffic in the candidate cell in the accumulation period may be checked in response to determining that the accumulated amount exceeds the first threshold; if there is no traffic, the candidate cell may be determined as a sleeping cell; and if there is traffic the accumulated amount may be reset.

In accordance with embodiments of the present invention, the first threshold may be adapted based on historical amount of traffic-related activities in the candidate cell. For example, a candidate first threshold may be obtained based on statistical information of the historical amount of traffic-related activities, and then the first threshold may be updated with the maximum of an initial first threshold and the candidate first threshold. The initial first threshold is fixed for the candidate cell. That is, the initial first threshold is a constant value. There is no need to manually change the initial first threshold according to different load conditions.

Figure 2:
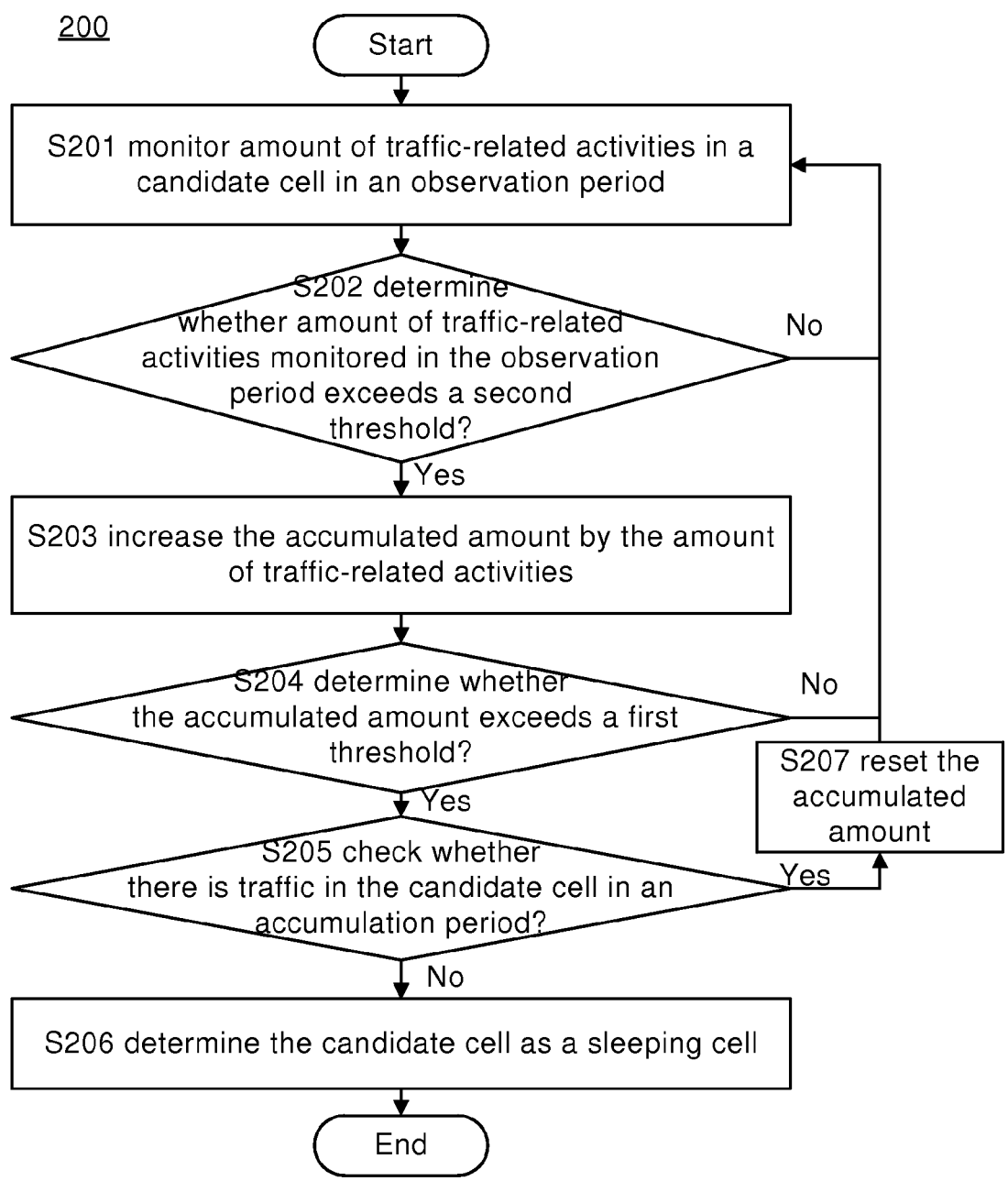
FIG. 2 illustrates a flow chart of a method for detecting a sleeping cell according to another embodiment of the invention.

Reference is now made to FIG. 2, which illustrates a flow chart of a method 200 for detecting a sleeping cell according to another embodiment of the invention. Method 200 may be considered as an embodiment of method 100 described above with reference to FIG. 1. In the following description of method 200, a first threshold and a second threshold are employed in detecting the sleeping cell. In particular, the second threshold is used in calculating the accumulated amount, and the first threshold is used in determining whether the candidate cell is a sleeping cell based on the accumulated amount. However, it is noted that this is only for the purpose of illustrating the principles of the present invention, rather than limiting the scope thereof.

After method 200 starts, at step S201, amount of traffic-related activities in a candidate cell is monitored in an observation period.

Step S201 in method 200 corresponds to step S101 in method 100 as described above. Similar with step S101, the monitoring at step S201 may be done by monitoring the amount of the traffic-related activities, such as PRACH preamble transfer, random access step-3 transfer, RRC Connection Setup message transfer, in an observation period.

At step S202, whether amount of traffic-related activities monitored in the observation period exceeds a second threshold is determined.

In accordance with embodiments of the present invention, the second threshold indicates a threshold which is set small enough so as to avoid miss real faults with low traffic load. The second threshold may be determined in several ways. For example, the second threshold may be either generated from the O&M system of the node controlling the candidate cell, or indicated by other external network node via the inter-node connections. In one embodiment, the second threshold may be configured as the experiential or theoretical expected maximum amount due to disturbing factors. In another embodiment, the second threshold may be configured as a larger value if the expected maximum amount is not obtained accurately, and it may be turned downward during an adapting process, which will be discussed below with respect to step S305. According to embodiments of the present invention, the second threshold may be set as the value of an initial second threshold, which is fixed for the candidate cell.

Figure 4A:
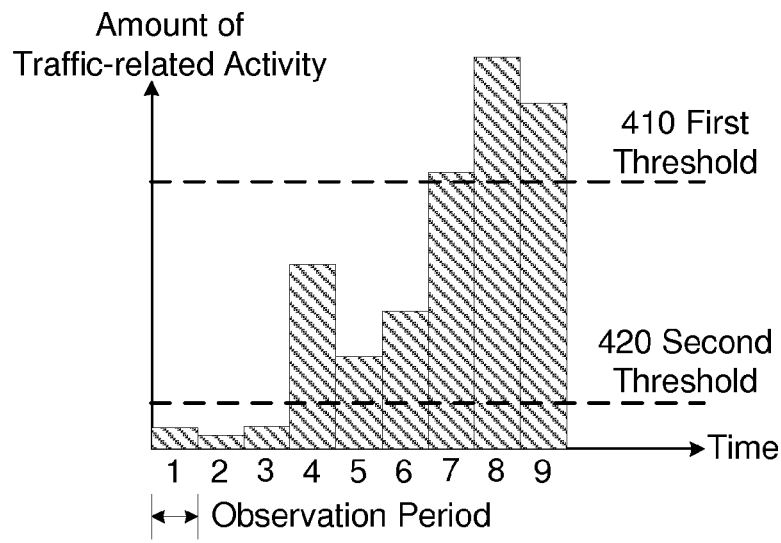
FIG. 4A illustrates a schematic diagram of amount of traffic-related activities according to an embodiment of the invention.

By comparing the amount of traffic-related activities monitored in the observation period with the second threshold, it may be determined whether amount of traffic-related activities monitored in the observation period exceeds a second threshold. Referring to FIG. 4A, which illustrates a schematic diagram of amount of traffic-related activities according to an embodiment of the invention, the vertical axis indicates amount of traffic related activities monitored in a candidate cell, and the horizontal axis indicates passed time. Each of the numerals 1, 2, . . . , 9 represents an observation period. As such, it is exemplarily illustrated nine observation periods in FIG. 4A. Additionally, FIG. 4A shows a first threshold 410 and a second threshold 420. It is seen that each of the amounts of traffic-related activities monitored in observation periods 1, 2 and 3 is less than the second threshold 420, and each of the amounts of traffic-related activities monitored in observation periods 4 to 9 exceeds the second threshold 420. Accordingly, at step S202 when the current observation is observation period 1, 2 or 3, it is determined that the amount of traffic-related activities monitored in the observation period does not exceed the second threshold, and the method 200 goes back to step S201 to, e.g., monitor amount of traffic-related activities in another observation period; and when the current observation is one of observation periods 4 to 9, it is determined that the amount of traffic-related activities monitored in the observation period exceeds the second threshold, and the method 200 proceeds to step S203 to calculate the accumulated amount.

At step S203, the accumulated amount is increased by the amount of traffic-related activities.

In accordance with embodiments of the present invention, the accumulated amount indicates accumulation of amount of traffic-related activities monitored in an accumulation period. According to an embodiment of the present invention, the accumulated amount may be initialized as zero, an empty value (e.g., NULL) or some other suitable value. During the detection of the sleeping cell, the accumulated amount may be accumulated gradually, and may be reset as zero or the empty value when certain requirements are met.

Figure 4B:
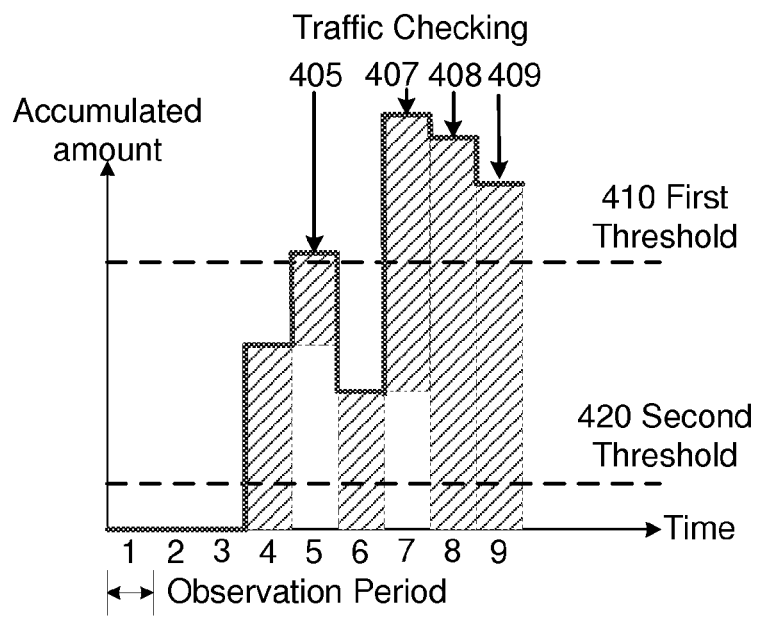
FIG. 4B illustrates a schematic diagram of accumulated amounts according to an embodiment of the invention.

Referring to FIG. 4B, which illustrates a schematic diagram of accumulated amounts according to an embodiment of the invention, same or similar reference numbers as those shown in FIG. 4A indicate same or similar elements. It is noted that the vertical axis in FIG. 4B indicates the accumulated amount, rather than amount of traffic related activities. The horizontal axis indicates passed time, e.g., nine observation periods. FIG. 4B also shows the first threshold 410 and the second threshold 420, which are the same as those shown in FIG. 4A.

As can be seen from FIG. 4A and FIG. 4B, since none of the amounts of traffic-related activities monitored in observation periods 1, 2 and 3 exceeds the second threshold 420, the accumulated amount will not be changed in the three observation periods, that is, the accumulated amount is zero in observation periods 1 to 3. Since the amount of traffic-related activities monitored in observation period 4 exceeds the second threshold 420, the accumulated amount is increased by the amount of traffic-related activities monitored in observation period 4. As such, the accumulated amount equals to zero plus the amount of traffic-related activities monitored in observation period 4.

At step S204, whether the accumulated amount exceeds a first threshold is determined.

In accordance with embodiments of the present invention, the first threshold indicates a threshold which is set large enough so as to reduce the false alarm caused due to disturbing factors. The first threshold may be determined in several ways. For example, the first threshold may be either generated from the O&M system of the node controlling the current cell, or indicated by other external network node via the inter-node connections. In one embodiment, the first threshold may be configured as the long-tem statistical mean value with time for the candidate cell. In another embodiment, the first threshold may be configured as a smaller value if the long-tem statistical mean value can not be obtained accurately, and it may be turned upward during an adapting process, which will be discussed below with respect to step S308. According to embodiments of the present invention, the first threshold is lager than the second threshold. In the embodiments, the first threshold may be set as the value of an initial first threshold, which is fixed for the candidate cell.

Referring to FIG. 4A and FIG. 4B again, regarding observation period 4, the accumulated amount is increased by the amount of traffic-related activities monitored in observation period 4, so the accumulated amount equals to that amount after step S203. At step S204, the accumulated amount is compared with the first threshold. It is seen from FIG. 4B that the accumulated amount in observation period 4 is less than the first threshold 410. As such, it is determined that the accumulated amount does not exceed the first threshold and the method 200 goes back to step S201. It is to be noted that although the method 200 returns to step S201 to monitor amount of traffic-related activities in another observation period, the accumulated amount will keep its current value for further processing and there is no necessity to reset the accumulated amount.

In another embodiment, regarding observation period 5 shown in FIG. 4A and FIG. 4B, it is noted that the amount of traffic-related activities monitored in observation period 5 exceeds the second threshold, so the accumulated amount is increased by the amount of traffic-related activities monitored in observation period 5 at step S203. As such, the accumulated amount equals to the sum of the last accumulated amount and the amount of traffic-related activities monitored in observation period 5. As discussed above, the last accumulated amount equals to the amount monitored in observation period 4. That is to say, the accumulated amount equals to the sum of the amount of traffic-related activities monitored in observation period 4 and that monitored in observation period 5, as shown in FIG. 4B. From FIG. 4B, it is seen that the accumulated amount in observation period 5 exceeds the first threshold 410. As such, the accumulated amount will no longer be accumulated with monitored amount of traffic-related activities, and the accumulation period may be determined as comprising observation periods 4 and 5. Next, the method 200 proceeds to step S205.

It is to be noted that, with respect to observation periods 6 and 7, similar processes occur as observation 4 and 5, and the corresponding accumulation period comprises observation periods 6 and 7. With respect to observation 8, since the amount of traffic-related activities monitored in this observation period exceeds both the second threshold and the first threshold, the corresponding accumulation period comprises only observation 8. Additionally, with respect to observation 9, since the amount of traffic-related activities monitored in this observation period also exceeds both the second threshold and the first threshold, the corresponding accumulation period comprises only observation 9.

At step S205, whether there is traffic in the candidate cell in an accumulation period is checked.

In accordance with the embodiments of the present invention, in response to determining that the accumulated amount exceeds the first threshold, whether there is traffic in the candidate cell in the accumulation period is checked. If there is no traffic, the method 200 proceeds to step S206 to determine the candidate cell as a sleeping cell; and if there is traffic, the method 200 goes to step S207 to reset the accumulated amount.

As discussed above, the accumulated amount in observation period 5 exceeds the first threshold 410, so whether there is traffic in the accumulation period will be checked at step S205. The numerical number 405 in FIG. 4B indicates traffic checking is performed with respect to observation period 5. In some other embodiments, each of the accumulated amounts in observation periods 7, 8 and 9 exceeds the first threshold 410. Accordingly, the numerical numbers 407, 408 and 409 in FIG. 4B indicate traffic checking is performed with respect to observation periods 7, 8 and 9, respectively.

Figure 4C:
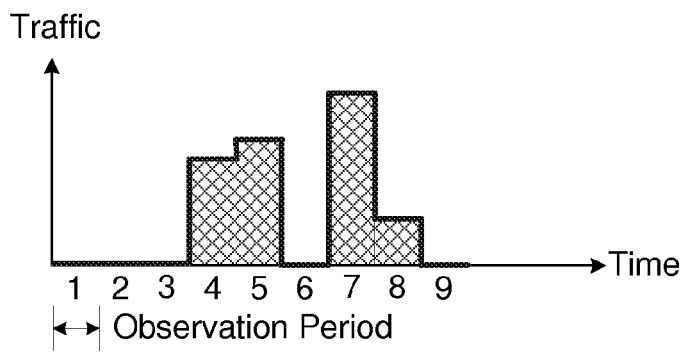
FIG. 4C illustrates a schematic diagram of traffic in a candidate cell according to an embodiment of the invention.

Now referring to FIG. 4C, a schematic diagram of traffic in a candidate cell according to an embodiment of the invention is illustrated. As shown in FIG. 4C, there is no traffic in observation periods 1, 2, 3, 6 and 9, and there is traffic in observation periods 4, 5, 7 and 8. It is to be noted that, in embodiments of the present invention, the case of "there is no traffic" indicates either there is not any traffic, or there is little traffic but the traffic amount is too small to be taken into account. In practice, "there is no traffic" may refer to an abnormal status of the candidate cell in which no or little actual traffic is happened.

As discussed, the traffic in the candidate cell may be check, as indicated by 405 407, 408 and 409. Referring to FIG. 4B and FIG. 4C, with respect to traffic checking 405, the accumulation period comprises observation periods 4 and 5, it may be determined that there is traffic because traffic has happened in both observation periods 4 and 5. With respect to traffic checking 407, the accumulation period comprises observation periods 6 and 7, it may be determined that there is traffic because traffic has happened in observation period 7 regardless there is no traffic in observation period 6. With respect to traffic checking 408, the accumulation period comprises one observation period 8, it may be determined that there is traffic because traffic has happened in observation period 8. For all of the above cases, the method 200 goes to step S207 to reset the accumulated amount. With respect to traffic checking 409, the accumulation period comprises one observation period 9, it may be determined that there is no traffic because no traffic has happened in observation period 9. In this case, the method 200 proceeds to step S206 to determine the candidate cell as a sleeping cell.

With respect to embodiments illustrated by FIG. 2, it is advantageous that, different from the existing solutions, the first threshold and the second threshold do not need to change manually with cell load situations. It is also advantageous that the false alarm ratio due to disturbing factors may be effectively decreased, and the high detection success ratio may be guaranteed for various cell load situations by accumulation processing.

Figure 3:
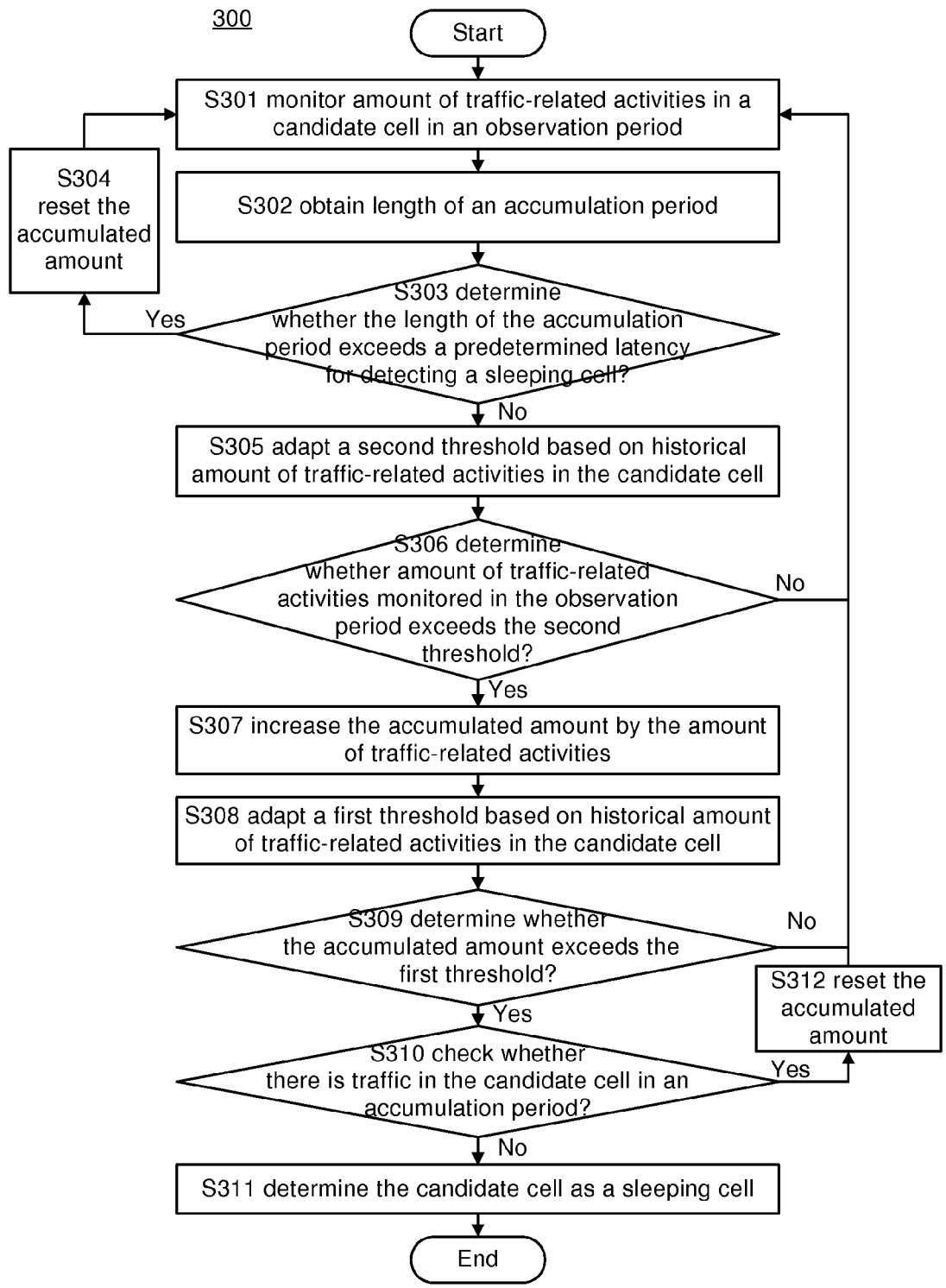
FIG. 3 illustrates a flow chart of a method for detecting a sleeping cell according to yet another embodiment of the invention.

Reference is now made to FIG. 3, which illustrates a flow chart of a method 300 for detecting a sleeping cell according to yet another embodiment of the invention. Method 300 may be considered as an embodiment of the method 100 described above with reference to FIG. 1 or the method 200 with reference to FIG. 2. In the following description of method 300, adaption of the first threshold and adaption of the second threshold are introduced into the detection of the sleeping cell, and a predetermined latency for detecting a sleeping cell is employed to restrict the length of the accumulation period. However, it is noted that this is only for the purpose of illustrating the principles of the present invention, rather than limiting the scope thereof.

After method 300 starts, at step S301, amount of traffic-related activities in a candidate cell is monitored in an observation period.

Step S301 in method 300 corresponds to step S201 in method 200 as described above. Similar with step S201, the monitoring at step S201 may be done by monitoring the amount of the traffic-related activities, such as PRACH preamble transfer, random access step-3 transfer, RRC Connection Setup message transfer, in an observation period.

At step S302, length of an accumulation period is obtained.

In accordance with embodiments of the present invention, the accumulation period indicates a period in which amount of traffic-related activities monitored in one or more observation periods are accumulated. The accumulation period does not have a fixed length, but has a variable length. For example, in the embodiment shown in FIGS. 4A to 4C, with respect to observation periods 4 and 5, the corresponding accumulation period comprises two observation periods; and with respect to observation period 9, the corresponding accumulation period comprises one observation period.

At step S303, whether the length of the accumulation period exceeds a predetermined latency for detecting a sleeping cell is determined.

In accordance with embodiments of the present invention, the length of the accumulation period may be limited, e.g., by an operator, a provider, a vendor, etc. The limit of the length of the accumulated period may be a predetermined latency for detecting a sleeping cell. In some embodiments, the predetermined latency may be set according to network conditions, system requirements, experiences of the operator, the provider, the vendor, etc. It is to be noted that the predetermined latency for detecting a sleeping cell may be set in several ways. Those skilled in the art will appreciate that the aforesaid examples are only for illustration not limitation.

By comparing the length of the accumulation period with the predetermined latency, it may be determined that whether the length of the accumulation period exceeds the predetermined latency. If yes, the method 300 goes to step S304 to reset the accumulated amount, and the accumulation process ends up; and if no, the method 300 proceeds to step S305.

It is advantageous to limit the length of the accumulation period. In this way, extra disturbing factors beyond the second threshold may be prevented from continuous accumulation, and the false alarm may be reduced accordingly. It is to be noted that it is optional to limit the length of the accumulation period according to embodiments of the present invention. In other words, the method according to the present invention may be performed without the optional steps S302 to S304.

At step S305, a second threshold is adapted based on historical amount of traffic-related activities in the candidate cell.

In accordance with embodiments of the present invention, optionally, the second threshold may be adapted based on historical amount of traffic-related activities in the candidate cell, while the relation that the first threshold is larger than the second threshold always holds. In some embodiments, at the beginning of method 300, the second threshold may be set as the value of an initial second threshold, which is fixed for the candidate cell. It is to be noted that the initial second threshold is the upper bound of the adapted second threshold.

The adaption of the second threshold may be implemented in several ways. In one embodiment, a candidate second threshold may be obtained based on statistical information of the historical amount of traffic-related activities, and the second threshold may be updated with the minimum of an initial second threshold and the candidate second threshold, wherein the initial second threshold is fixed for the candidate cell.

The historical amount of traffic-related activities may comprise amount of traffic-related activities monitored in one or more observation periods before the current observation period. For example, in the case that the observation period in which amount of traffic-related activities is monitored at step S301 is observation period 4 shown in FIG. 4A, the current observation period is observation period 4 and the historical amount of traffic-related activities may comprise the amount monitored in any combination of observation periods 1 to 3. Statistical information of the historical amount of traffic-related activities may comprise distribution of the historical amount of traffic-related activities, average amount of traffic-related activities, and/or any other appropriate statistical information.

In some embodiments of the present invention, the candidate second threshold may be obtained based on the average amount of traffic-related activities. Specifically, the candidate second threshold may be set as the average amount of traffic-related activities, or the candidate second threshold may calculated based on the average amount of traffic-related activities and a predetermined weight. For example, the average amount of traffic-related activities may be weighted by a weight, which may be predetermined as a constant value larger than 1, e.g., 120%.

In some other embodiments of the present invention, the candidate second threshold may be obtained based on a weighted average amount of traffic-related activities. Specifically, the amounts of traffic-related activities monitored in recent observation periods may be weighted by a set of weights, wherein the weights in the set may be increasing over time and the sum of all weights equals to 1; and then, the candidate second threshold may be set as the sum of the amounts of traffic-related activities monitored in recent observation periods, wherein each amount has been weighted by a corresponding weight in the set.

By comparing the initial second threshold and the candidate second threshold, it may be determined that which is the smaller one. The second threshold may be then updated with the smaller one in the initial second threshold and the candidate second threshold and will be used in subsequent steps of method 300.

Figure 5:
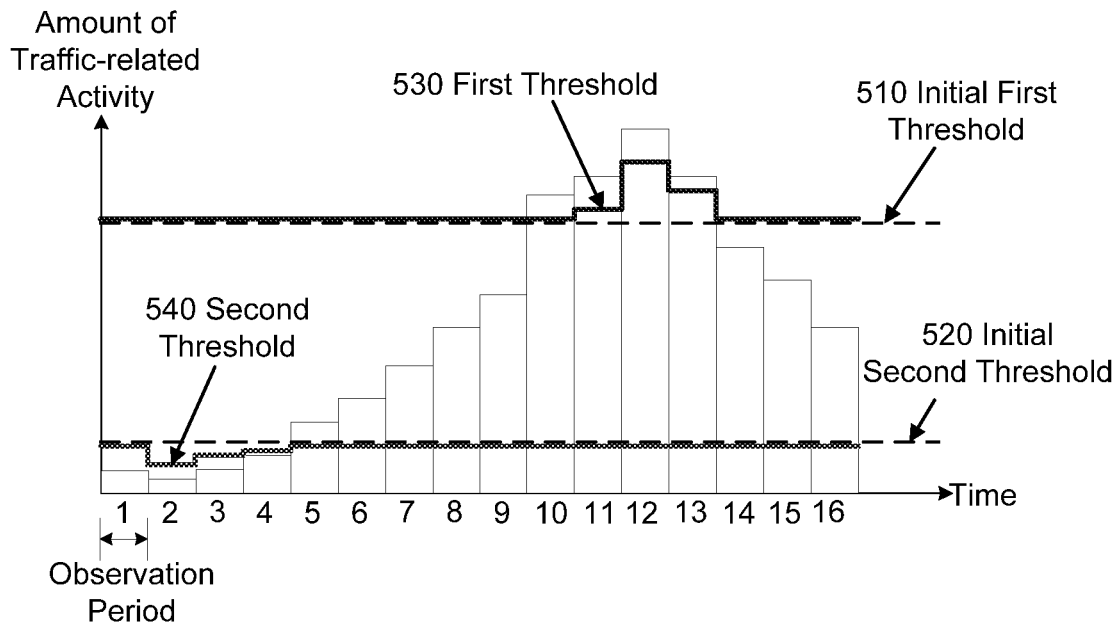
FIG. 5 illustrates a schematic diagram of adapting a first threshold and adapting a second threshold according to an embodiment of the invention.

Referring to FIG. 5, which illustrates a schematic diagram of adapting a first threshold and adapting a second threshold according to an embodiment of the invention, the initial second threshold is denoted as 520 and the second threshold which is adapted is denoted as 540. It is noted that the second threshold 540 may be not the same for observation periods 1 to 16, but it is always less than or equal to the initial second threshold 520.

It is advantageous to adapt the second threshold during the detection of the sleeping cell. In this way, the second threshold is adjustable for different load conditions, and may be more suitable for the current load condition in the candidate cell. As such, the accuracy of detection may be improved in comparison to a constant threshold. It is to be noted that it is optional to adapt the second threshold. In other words, the method according to the present invention may be performed without the optional step S305.

At step S306, whether amount of traffic-related activities monitored in the observation period exceeds the second threshold is determined.

Step S306 in method 300 corresponds to step S202 in method 200 as described above. Similar with step S202, if it is determined that amount of traffic-related activities monitored in the observation period exceeds the second threshold, the method 300 proceeds to step S307 to increase the accumulated amount; and if not, the method 300 returns to step S301 to monitor amount of traffic-related activities in another observation period.

At step S307, the accumulated amount is increased by the amount of traffic-related activities.

Step S307 in method 300 corresponds to step S203 in method 200 as described above. Similar with step S203, details for calculating the accumulated amount may be found in descriptions with respect to FIG. 4A and FIG. 4B.

At step S308, a first threshold is adapted based on historical amount of traffic-related activities in the candidate cell.

In accordance with embodiments of the present invention, optionally, the first threshold may be adapted based on historical amount of traffic-related activities in the candidate cell, while the relation that the first threshold is larger than the second threshold always holds. In some embodiments, at the beginning of method 300, the first threshold may be set as the value of an initial first threshold, which is fixed for the candidate cell. It is to be noted that the initial first threshold is the lower bound of the adapted first threshold.

The adaption of the first threshold may be implemented in several ways. In one embodiment, a candidate first threshold may be obtained based on statistical information of the historical amount of traffic-related activities, and the first threshold may be updated with the maximum of an initial first threshold and the candidate first threshold, wherein the initial first threshold is fixed for the candidate cell.

As discussed above, the historical amount of traffic-related activities may comprise amount of traffic-related activities monitored in one or more observation periods before the current observation period. Statistical information of the historical amount of traffic-related activities may comprise distribution of the historical amount of traffic-related activities, average amount of traffic-related activities, and/or any other appropriate statistical information.

In some embodiments of the present invention, the candidate first threshold may be obtained based on the average amount of traffic-related activities. Specifically, the candidate first threshold may be set as the average amount of traffic-related activities, or the candidate first threshold may be calculated based on the average amount of traffic-related activities and a predetermined weight. For example, the average amount of traffic-related activities may be weighted by a weight, which may be predetermined as a constant value smaller than 1, e.g., 80%.

In some other embodiments of the present invention, the candidate first threshold may be obtained based on a weighted average amount of traffic-related activities. Specifically, the amounts of traffic-related activities monitored in recent observation periods may be weighted by a set of weights, wherein the weights in the set may be increasing over time and the sum of all weights equals to 1; and then, the candidate first threshold may be set as the sum of the amounts of traffic-related activities monitored in recent observation periods, wherein each amount has been weighted by a corresponding weight in the set.

By comparing the initial first threshold and the candidate first threshold, it may be determined that which is the larger one. The first threshold may be then updated with the larger one in the initial first threshold and the candidate first threshold and will be used in subsequent steps of method 300.

Referring to FIG. 5 again, the initial first threshold is denoted as 510 and the first threshold which is adapted is denoted as 530. It is noted that the first threshold 530 may be not the same for observation periods 1 to 16, but it is always larger than or equal to the initial first threshold 510.

It is advantageous to adapt the first threshold during the detection of the sleeping cell. In this way, the first threshold is adjustable for different load conditions, and may be more suitable for the current load condition in the candidate cell. As such, the accuracy of detection may be improved in comparison to a constant threshold. It is to be noted that it is optional to adapt the first threshold. In other words, the method according to the present invention may be performed without the optional step S308.

At step S309, whether the accumulated amount exceeds the first threshold is determined.

Step S309 in method 300 corresponds to step S204 in method 200 as described above. Similar with step S204, if it is determined that the accumulated amount exceeds the first threshold, the method 300 proceeds to step S310 to check traffic in the candidate cell; and if the accumulated amount does not exceed the first threshold, the method 300 returns to step S301 to monitor amount of traffic-related activities in another observation period.

At step S310, whether there is traffic in the candidate cell in an accumulation period is checked.

Step S310 in method 300 corresponds to step S205 in method 200 as described above. Similar with step S205, if there is no traffic, the method 300 proceeds to step S311 to determine the candidate cell as a sleeping cell; and if there is traffic, the method 300 goes to step S312 to reset the accumulated amount.

Figure 6:
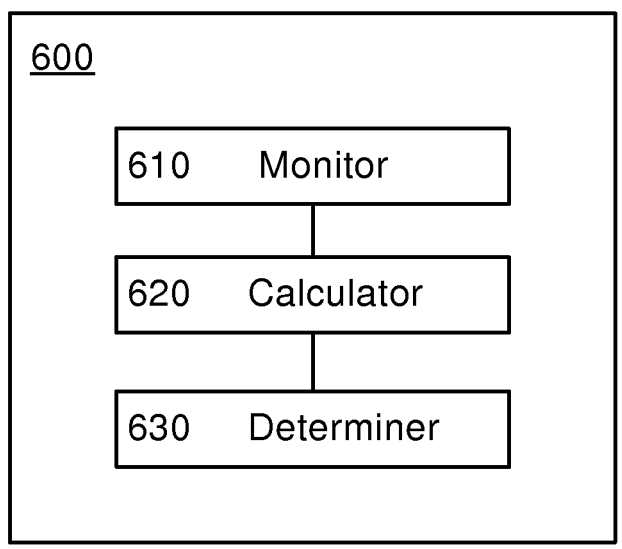
FIG. 6 illustrates a block diagram of an apparatus for detecting a sleeping cell according to embodiments of the invention.

Reference is now made to FIG. 6, which illustrates a block diagram of an apparatus 600 for detecting a sleeping cell according to embodiments of the invention. As shown, the apparatus 600 comprises: a monitor 610 configured to monitor amount of traffic-related activities in a candidate cell in an observation period; a calculator 620 configured to calculate accumulated amount based on the monitored amount of traffic-related activities, wherein the accumulated amount indicates accumulation of amount of traffic-related activities monitored in an accumulation period comprising at least one observation period; and a determiner 630 configured to determine whether the candidate cell is a sleeping cell based on the accumulated amount.

In accordance with embodiments of the present invention, the determiner 630 may comprise: a first determining unit configured to determine whether the accumulated amount exceeds a first threshold; a checking unit configured to check, in response to determining that the accumulated amount exceeds the first threshold, whether there is traffic in the candidate cell in the accumulation period; a second determining unit configured to determine the candidate cell as a sleeping cell if there is no traffic; and a first resetting unit configured to reset the accumulated amount if there is traffic.

In accordance with embodiments of the present invention, the determiner 630 may comprise: a first adapting unit configured to adapt the first threshold based on historical amount of traffic-related activities in the candidate cell.

In some embodiments, the first adapting unit of the determiner 630 may comprise: a first obtaining unit configured to obtain a candidate first threshold based on statistical information of the historical amount of traffic-related activities; and a first updating unit configured to update the first threshold with the maximum of an initial first threshold and the candidate first threshold, wherein the initial first threshold is fixed for the candidate cell.

In accordance with embodiments of the present invention, the calculator 620 may comprise: a third determining unit configured to determine whether amount of traffic-related activities monitored in the observation period exceeds a second threshold; and an increasing unit configured to increase, in response to determining that the amount of traffic-related activities monitored in the observation period exceeds the second threshold, the accumulated amount by the amount of traffic-related activities.

In accordance with embodiments of the present invention, the calculator 620 may comprise: a second adapting unit configured to adapt the second threshold based on historical amount of traffic-related activities in the candidate cell.

In some embodiments, the second adapting unit of the calculator 620 may comprise: a second obtaining unit configured to obtain a candidate second threshold based on statistical information of the historical amount of traffic-related activities; and a second updating unit configured to update the second threshold with the minimum of an initial second threshold and the candidate second threshold, wherein the initial second threshold is fixed for the candidate cell.

In accordance with embodiments of the present invention, the calculator 620 may comprise: a third obtaining unit configured to obtain length of the accumulation period; a fourth determining unit configured to determine whether the length of the accumulation period exceeds a predetermined latency for detecting a sleeping cell; and a second resetting unit configured to reset the accumulated amount in response to determining that the length of the accumulation period exceeds the predetermined latency.

It is to be noted that the apparatus 600 may be implemented in a BS, a BSC, a gateway, a relay, a server, or any other applicable device, and the apparatus 600 may be applied in several communication networks, such as a GSM, CDMA, UMTS and LTE network. It is also to be noted that the monitor 610, calculator 620 and determiner 630 may be implemented by any suitable technique either known at present or developed in the future. Further, a single device shown in FIG. 6 may be alternatively implemented in multiple devices separately, and multiple separated devices may be implemented in a single device. The scope of the present invention is not limited in these regards.

It is noted that, in some embodiment of the present disclosure, the apparatus 600 may be configured to implement functionalities as described with reference to FIGS. 1-3. Therefore, the features discussed with respect to any of methods 100, 200 and 300 may apply to the corresponding components of the apparatus 600. It is further noted that the components of the apparatus 600 may be embodied in hardware, software, firmware, and/or any combination thereof. For example, the components of the apparatus 600 may be respectively implemented by a circuit, a processor or any other appropriate selection device. Those skilled in the art will appreciate that the aforesaid examples are only for illustration not limitation.

In some embodiment of the present disclosure, the apparatus according to the present invention may comprise at least one processor. The at least one processor suitable for use with embodiments of the present disclosure may include, by way of example, both general and special purpose processors already known or developed in the future. The apparatus may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus to at least perform according to any of methods 100, 200 and 300 as discussed above.

For the purpose of illustrating spirit and principle of the present invention, some specific embodiments thereof have been described above. It will be appreciated by a person skilled in the art that embodiments of the present invention may detect a sleeping cell based on accumulation of amount of traffic-related activities monitored in an accumulation period. As a result, false alarms caused by disturbing factors are effectively decreased and the accuracy of sleeping cell detection for different load situations is effectively improved. Additionally, according to preferable embodiment of the present invention, adaption processes may be optionally employed to the first threshold and the second threshold, and the length of the accumulation period may be optionally limited, so that the detection accuracy may be further improved.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 1 to 3 may be viewed as method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit, FPGA or ASIC that is configurable to operate in accordance with the exemplary embodiments of the present invention.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various modifications, adaptations to the foregoing exemplary embodiments of this invention may become apparent to those skilled in the relevant arts in view of the foregoing description, when read in conjunction with the accompanying drawings. Any and all modifications will still fall within the scope of the non-limiting and exemplary embodiments of this invention. Furthermore, other embodiments of the inventions set forth herein will come to mind to one skilled in the art to which these embodiments of the invention pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for detecting a sleeping cell, comprising:
   monitoring an amount of traffic-related activities in a candidate cell in an observation period, the traffic-related activities comprising one or more activities that have a correlation with traffic in the candidate cell;
   calculating an accumulated amount based on the monitored amount of traffic-related activities, wherein the accumulated amount indicates an accumulation of one or more amounts of traffic-related activities monitored in an accumulation period, the accumulation period comprising at least one observation period;
   determining whether the accumulated amount exceeds a first threshold;
   in response to determining that the accumulated amount exceeds the first threshold, checking whether there is traffic in the candidate cell in the accumulation period;
   determining the candidate cell as a sleeping cell if there is no traffic; and
   resetting the accumulated amount if there is traffic.

2. The method of claim 1, comprising:
   adapting the first threshold based on a historical amount of traffic-related activities in the candidate cell.

3. The method of claim 2, wherein adapting the first threshold based on the historical amount of traffic-related activities in the candidate cell comprises:
   obtaining a candidate first threshold based on statistical information of the historical amount of traffic-related activities; and
   updating the first threshold with a maximum of an initial first threshold and the candidate first threshold, wherein the initial first threshold is fixed for the candidate cell.

4. The method of claim 1, wherein calculating the accumulated amount based on the monitored amount of traffic-related activities comprises:
   determining whether the amount of traffic-related activities monitored in the observation period exceeds a second threshold; and
   in response to determining that the amount of traffic-related activities monitored in the observation period exceeds the second threshold, increasing the accumulated amount by the amount of traffic-related activities.

5. The method of claim 4, wherein calculating the accumulated amount based on the monitored amount of traffic-related activities comprises:
   adapting the second threshold based on a historical amount of traffic-related activities in the candidate cell.

6. The method of claim 5, wherein adapting the second threshold based on the historical amount of traffic-related activities in the candidate cell comprises:
   obtaining a candidate second threshold based on statistical information of the historical amount of traffic-related activities; and
   updating the second threshold with a minimum of an initial second threshold and the candidate second threshold, wherein the initial second threshold is fixed for the candidate cell.

7. An apparatus for detecting a sleeping cell, comprising:
   a memory; and
   one or more processors coupled to the memory, the one or more processors configured to:
   monitor an amount of traffic-related activities in a candidate cell in an observation period, the traffic-related activities comprising one or more activities that have a correlation with traffic in the candidate cell;
   calculate an accumulated amount based on the monitored amount of traffic-related activities, wherein the accumulated amount indicates accumulation of an amount of traffic-related activities monitored in an accumulation period comprising at least one observation period;
   determine whether the accumulated amount exceeds a first threshold;
   check, in response to determining that the accumulated amount exceeds the first threshold, whether there is traffic in the candidate cell in the accumulation period;
   determine the candidate cell as a sleeping cell if there is no traffic; and
   reset the accumulated amount if there is traffic.

8. The apparatus of claim 7, wherein the one or more processors are configured to:

adapt the first threshold based on a historical amount of traffic-related activities in the candidate cell.

9. The apparatus of claim 8, wherein the one or more processors configured to adapt the first threshold based on a historical amount of traffic-related activities in the candidate cell comprise one or more processors configured to:
obtain a candidate first threshold based on statistical information of the historical amount of traffic-related activities; and
update the first threshold with a maximum of an initial first threshold and the candidate first threshold, wherein the initial first threshold is fixed for the candidate cell.

10. The apparatus of claim 7, wherein the one or more processors are configured to:
determine whether the amount of traffic-related activities monitored in the observation period exceeds a second threshold; and
increase, in response to determining that the amount of traffic-related activities monitored in the observation period exceeds the second threshold, the accumulated amount by the amount of traffic-related activities.

11. The apparatus of claim 10, wherein the one or more processors are configured to:
adapt the second threshold based on a historical amount of traffic-related activities in the candidate cell.

12. The apparatus of claim 11, wherein the one or more processors configured to adapt the second threshold based on the historical amount of traffic-related activities in the candidate cell comprise one or more processors configured to:
obtain a candidate second threshold based on statistical information of the historical amount of traffic-related activities; and
update the second threshold with a minimum of an initial second threshold and the candidate second threshold, wherein the initial second threshold is fixed for the candidate cell.

* * * * *